United States Patent
Supalov

(10) Patent No.: US 7,966,624 B2
(45) Date of Patent: Jun. 21, 2011

(54) USING MESSAGE PASSING INTERFACE (MPI) PROFILING INTERFACE FOR EMULATING DIFFERENT MPI IMPLEMENTATIONS

(75) Inventor: Alexander V. Supalov, Erftstadt (DE)

(73) Assignee: Intel Corporation, Santa Clara, CA (US)

( * ) Notice: Subject to any disclaimer, the term of this patent is extended or adjusted under 35 U.S.C. 154(b) by 972 days.

(21) Appl. No.: 11/894,954

(22) Filed: Aug. 22, 2007

(65) Prior Publication Data

US 2009/0055836 A1 Feb. 26, 2009

(51) Int. Cl.
*G06F 13/00* (2006.01)
(52) U.S. Cl. .......... 719/328; 719/313; 719/331
(58) Field of Classification Search ............. 719/313, 719/328, 331
See application file for complete search history.

(56) References Cited

U.S. PATENT DOCUMENTS

| | | | |
|---|---|---|---|
| 6,782,537 B1 * | 8/2004 | Blackmore et al. | 719/313 |
| 2006/0282838 A1 * | 12/2006 | Gupta et al. | 719/313 |
| 2007/0097952 A1 | 5/2007 | Truschin et al. | 370/351 |
| 2007/0156874 A1 | 7/2007 | Magro et al. | 709/223 |
| 2007/0245171 A1 * | 10/2007 | Ohly et al. | 714/42 |
| 2008/0127203 A1 * | 5/2008 | Huang et al. | 719/313 |

OTHER PUBLICATIONS

U.S. Appl. No. 11/528,201, filed Sep. 27, 2006, entitled "Virtual Heterogeneous Channel for Message Passing," by Alexander V. Supalov, et al.

* cited by examiner

*Primary Examiner* — Andy Ho
(74) *Attorney, Agent, or Firm* — Trop, Pruner & Hu, P.C.

(57) ABSTRACT

In one embodiment, the present invention includes a method for receiving an application linked against a first application binary interface (ABI), providing an ABI wrapper associated with the application, and binding the application to a native message passing interface (MPI) library using the ABI wrapper and the profiling message passing interface (PMPI). Other embodiments are described and claimed.

17 Claims, 4 Drawing Sheets

USING MESSAGE PASSING INTERFACE (MPI) PROFILING INTERFACE FOR EMULATING DIFFERENT MPI IMPLEMENTATIONS

BACKGROUND

Processes typically communicate through internode or intranode messages. There are many different types of standards that have been formed to attempt to simplify the communication of messages between processes. One such standard is the message passing interface (called "MPI"). MPI: A Message-Passing Interface Standard, Message Passing Interface Forum, May 5, 1994; and MPI-2: Extension to the Message-Passing Interface, Message Passing Interface Forum, Jul. 18, 1997. MPI is essentially a standard library of routines that may be called from programming languages, such as FORTRAN and C. MPI is portable and typically fast due to optimization of the platform on which it is run.

Even though the MPI standards strictly define the Application Programming Interface (API) of all MPI functions, every MPI library ships with its own Application Binary Interface (ABI). Due to this, applications linked against a particular MPI implementation generally cannot run on top of another MPI implementation. Accordingly, extensive steps are needed to transition an application from one MPI implementation to another, including re-compilation and re-linking.

DETAILED DESCRIPTION

Various embodiments allow an MPI library of a given MPI implementation to emulate other MPI implementations without modification of the main library. Still further, embodiments may provide special MPI interfaces without such modification. To enable these features, embodiments provide a so-called foreign ABI wrapper on top of a particular native MPI implementation, where the native MPI implementation is called by the foreign ABI wrapper through the standard MPI profiling interface (PMPI).

Figure 1:
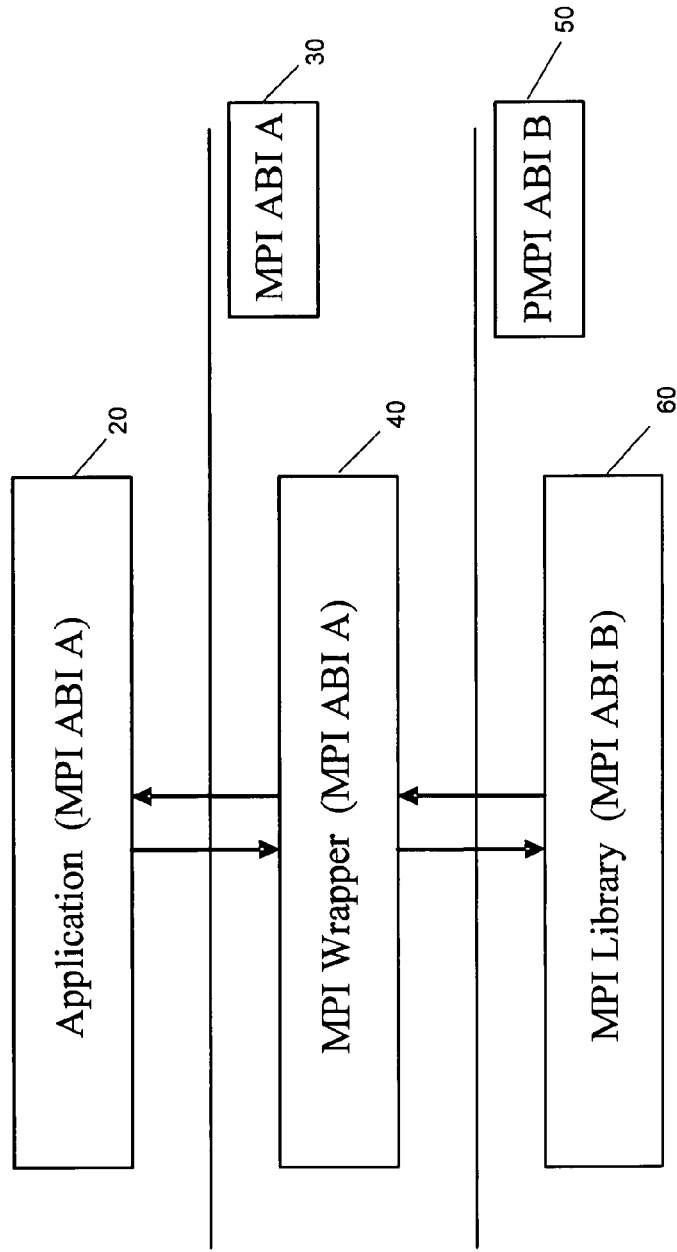
FIG. 1 is a block diagram of software interaction in accordance with one embodiment of the present invention.

As shown in FIG. 1, an arrangement of an application, wrapper and MPI library may enable transition of an application written against one MPI library to execute using a second MPI library, without re-compilation or re-linking of the application. As shown in FIG. 1, an application 20 is present. Application 20 may be linked against a foreign MPI library using a first MPI ABI (i.e., MPI ABI A). To enable execution using a second MPI library, namely MPI library 60, which may be written in accordance with a native MPI implementation (i.e., MPI ABI B), a foreign wrapper 40 may be presented on top of MPI library 60. MPI wrapper 40 may be written to the first MPI, namely MPI ABI A. Referring now to Table 1, shown is an example ABI wrapper in C language.

TABLE 1

```
int Foreign_calling_convention_prefix MPI_Recv(Foreign_void_ptr f_buf,Foreign_int
f_count,Foreign_MPI_Datatype f_type,Foreign_int f_src,Foreign_int
f_tag,Foreign_MPI_Comm f_comm,Foreign_MPI_Status_ptr f_stat)
Foregn_calling_convention_suffix
{
  Native_void_ptr n_buf;
  Native_int n_count,n_src,n_tag;
  Native_MPI_Datatype n_type;
  Native_MPI_Comm n_comm;
  Native_MPI_Status n_stat;
  /* optional argument assignment */
  n_buf = f_buf;
  /* any other preliminary actions, like optional input data conversion (f_type to n_type, etc.) */
  /* this may also include side effects like argument checking, trace generation, etc. */
  PMPI_Recv(n_buf,n_count,n_type,n_src,n_tag,n_comm,*n_stat);
  /* any closing actions like optional output data conversion (n_stat to f_stat, etc.) */
  /* this may also include side effects like error handling, trace generation, etc. */
}
```

Of course, this is but one of the possible ways to implement an ABI wrapper. It may change depending on the environment in which the ABI wrapper layer is built and the task at hand. For example, the Foreign_and Native_ prefixed data types may be represented by macros or respective plain data types, etc. The wrappers may also look differently in other programming languages.

To enable communication between these different code layers, a first ABI, namely MPI ABI A 30, may enable communication between application 20 and MPI wrapper 40. In turn, the standard profiling interface, namely PMPI ABI B 50, which enables MPI wrapper 40 to call MPI library 60 through the standard MPI profiling interface, i.e., PMPI ABI B 50, is used for ABI conversion. While shown with this particular implementation in the embodiment of FIG. 1, the scope of the present invention is not limited in this regard. For example, in other implementations multiple wrappers may be written on top of MPI library 60. Furthermore, such wrappers each may be of a different foreign MPI, e.g., of different MPI implementations, to enable dynamic binding and thus easy transition for applications written in a given MPI implementation to execute on an MPI library of a different implementation. The ABI differences may include different calling conventions, i.e., the method of passing the arguments, entering the function and leaving it. The foreign ABI wrapper itself may select and dynamically load the appropriate native MPI library (i.e., the optimized or debugging version), or perform other actions related to the adjustment of the runtime environment for the current execution. The ABI wrapper may be restricted to include only those MPI functions that are actually called by the target application. Still further, in some embodiments rather than using the standard profiling interface for communication with the application, an equivalent non-standard interface may be used. In this way, the standard PMPI_* profiling interface may be left open for use by third-party tracing tools or the like.

Note that every MPI implementation is required to provide a profiling interface. This interface is implemented by universally shifting all mainline MPI function names (MPI_*) into profiling name space (PMPI_*), and making the mainline MPI function names (MPI_*), say, weak symbols that reference the respective profiling strong symbols (PMPI_*). Due to this, the user of the respective MPI implementation can replace the implementation of the mainline MPI functions (MPI_*) by some wrappers that perform trace generation, statistics gathering, logging, memory checking, correctness checking, or any other additional functions before calling the underlying MPI implementation through the profiling interface (PMPI_*).

In this way, the original library can be made looking externally like another MPI implementation. One just needs to implement a foreign ABI in the wrapper functions, and use the native ABI through the profiling interface (PMPI_*). The wrappers may have to take care of converting foreign data into native format and back on return of data to the application, but this may be unnecessary if the size of the respective opaque MPI data entities is equal to each other in both MPI implementations involved.

Figure 2:
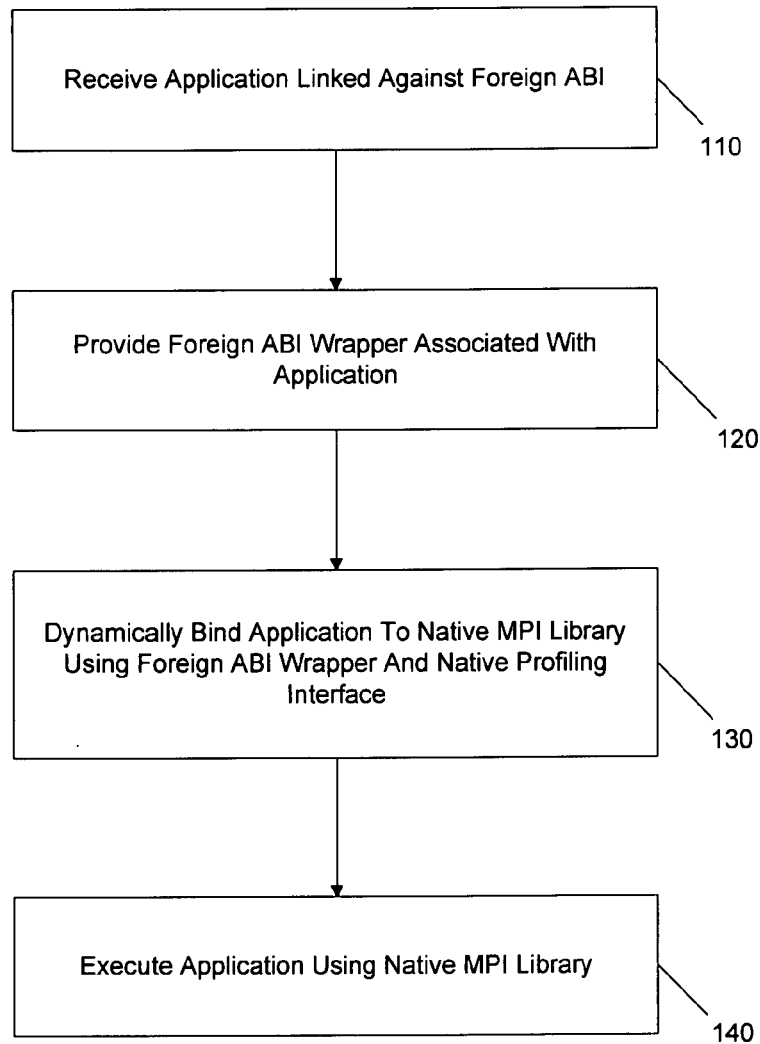
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may begin by receiving an application linked against a foreign ABI (block 110). For example, an application may be present in a platform that has a first (i.e., native) MPI library, where the application was written on a different system having a different (i.e., foreign) MPI library implementation.

Next, control passes to block 120 where a foreign ABI wrapper may be provided that is associated with the application. Specifically, a foreign ABI wrapper may be written to enable communication between the application and the native MPI library. This wrapper may enable conversion of data from a format associated with the application to a format of the MPI library, if the formats differ, e.g., in width or another such measure. Note that this foreign ABI wrapper may be written on top of the native MPI library. In this way, an application may be readied for execution on the native MPI library.

Thus still referring to FIG. 2, dynamic binding of the application to the native MPI library may be performed (block 130). The dynamic binding may occur using the foreign ABI wrapper and a native profiling interface. More specifically, the native MPI library may be called by the foreign ABI wrapper using a standard profiling interface, i.e., PMPI. In this way, the application may execute using the native MPI library (block 140). While shown with this particular implementation in the embodiment of FIG. 2, the scope of the present invention is not limited in this regard. Note that one does not need to rely on dynamic linkage to use an embodiment. One embodiment may relink statically in the absence of the application source code. In this case, the ABI wrapper library is mentioned before the native MPI library in the linker run string, and the resulting statically linked application will use the native MPI library without recompilation of the application.

Thus rather than emulating a foreign MPI library using a given native MPI library by re-compiling the native library with the respective foreign MPI headers files (mpi.h and fmpi.h), embodiments resolve ABI conversion in an elegant and standard conforming way, and reduce transition to a given native MPI using dynamic binding instead of re-compilation or re-linkage.

Embodiments thus allow a native MPI library to emulate other MPI implementations and provide special purpose MPI interfaces without modification of the main library. For example, some customers have special needs, such as an interface in which all integer values are 64-bits rather than 32-bits long. While transforming the whole of the MPI library to work with 64-bit integers can be burdensome, providing an extra interface (i.e., a foreign wrapper) that uses 64-bit integers and maps them to the 32-bit integers internally, may help customers meet their goals. This reduces transition of applications from a foreign MPI implementation to a native MPI library to dynamic binding at runtime, without re-compilation or re-linkage.

Figure 3:
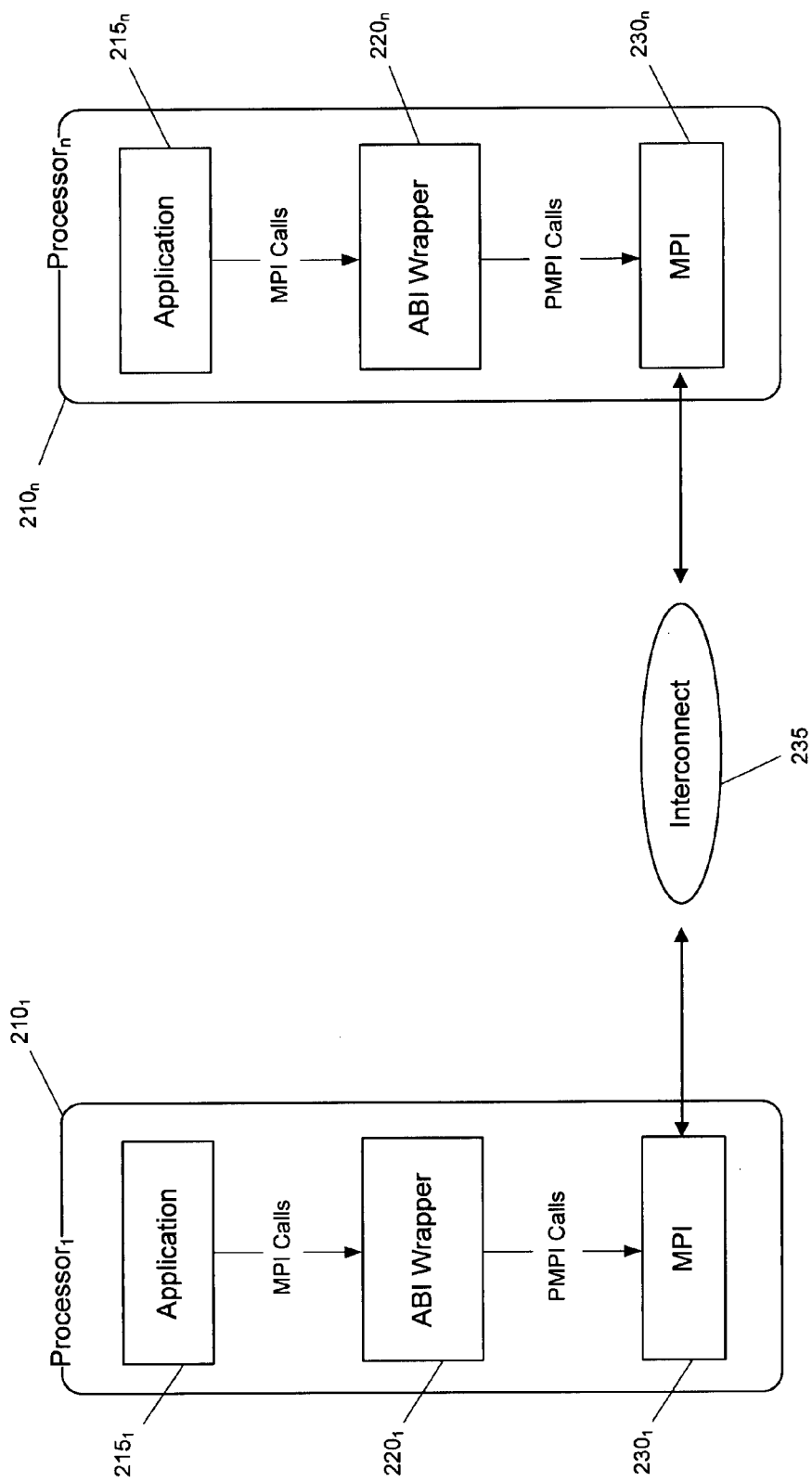
FIG. 3 is a block diagram of the interrelation between multiple processes in accordance with an embodiment of the present invention.

Shown in FIG. 3 is a block diagram of the interrelation between multiple processes in accordance with an embodiment of the present invention. As shown in FIG. 3, a plurality of processors $210_1$-$210_n$ (generically processor 210) are present. Each processor may include a process or application $215_1$-$215_n$ (generically application 215). In some embodiments, the system of FIG. 3 is an exemplary distributed application which is cooperatively implemented via generally contemporaneous execution of machine accessible instructions of multiple processors 210. In particular, a first process (i.e., software application $215_1$) may be executed on first processor $210_1$ and a second software application $215_n$ may be executed by second processor $210_n$, which cooperatively realize the example distributed application using any variety of distributed computing algorithms, techniques and/or methods. In the example system of FIG. 3, the example software applications 215 implement different machine accessible instructions. Alternatively, the example software applications may implement similar and/or identical machine accessible instructions.

For simplicity and ease of understanding, the example two processor system of FIG. 3 is referenced. However, distributed applications may be implemented by systems incorporating any number and/or variety of processors. For example, one or more processes of a distributed application may be implemented by a single processor, a single process may be implemented by each processor, etc. Applications 215 may be developed using any variety of programming tools and/or languages and may be used to implement any variety of distributed applications. In the example system of FIG. 3, processors 210 may be implemented within a single computing device, system and/or platform or may be implemented by separate devices, systems and/or platforms. Further, processors 210 may execute any variety of operating system(s).

For purposes of discussion, assume that each application 215 is written and linked to a MPI implementation different than that of an associated MPI library 230 (generally). To enable easy transition to the corresponding native MPI 230, an ABI wrapper $220_1$-$220_n$ (generically wrapper 230) written to the same MPI implementation as application 215 intercepts MPI calls made by the process 215 to library $230_1$-$230_n$ (generically library 230) of FIG. 3, which facilitates the exchange of, for example, distributed application messages, between applications 215. ABI wrapper 220 thus calls MPI library 130 using PMPI calls. In turn, these MPI libraries 230 may perform requested operations for application 215 which may be transmitted via an interconnect 235 which, in one embodiment may be a fast interconnect such as a point-topoint interconnect, although the scope of the present invention is not limited in this regard.

Figure 4:
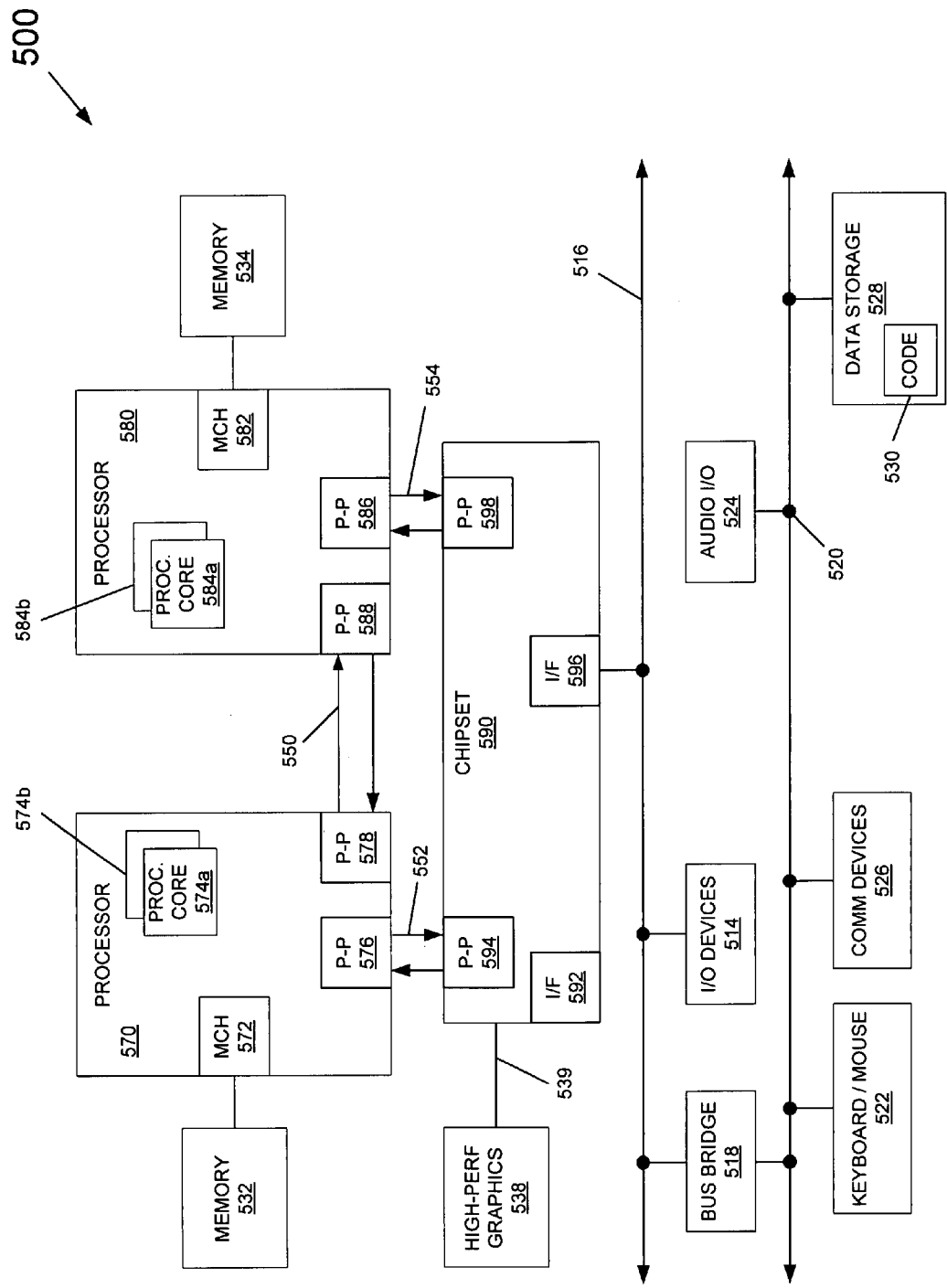
FIG. 4 is a block diagram of a multiprocessor system in which embodiments of the present invention may be used.

Embodiments may be suited for many different types of platforms. Referring now to FIG. 4, shown is a block diagram of a multiprocessor system in which embodiments of the present invention may be implemented. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574*a* and 574*b* and processor cores 584*a* and 584*b*), although other cores and potentially many more other cores may be present in particular embodiments.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538 via a bus 539.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an application linked against a first application binary interface (ABI) in a processor of a platform;
   providing an ABI wrapper associated with the application; and
   dynamically binding the application to a native message passing interface (MPI) library using the ABI wrapper and a native profiling interface associated with the native MPI library in the processor, wherein the native profiling interface corresponds to a profiling message passing interface (PMPI), wherein the first ABI is associated with a MPI library having a different implementation than the native MPI library.

2. The method of claim 1, further comprising executing the application on the processor using the native MPI library.

3. The method of claim 1, further comprising emulating a foreign MPI library associated with the application using the PMPI and without re-compilation or re-linkage of the application.

4. The method of claim 3, further comprising providing a mapping function in the ABI wrapper to map data of a first bit width to data of a second bit width, wherein the first bit width is associated with the foreign MPI library and the second bit width is associated with the native MPI library.

5. The method of claim 1, wherein the ABI wrapper is to perform correctness checking, trace generation, statistics gathering, and memory checking.

6. The method of claim 5, wherein the ABI wrapper is to convert data of a first format associated with the application to data of a second format associated with the native MPI library and to convert data of the second format to data of the first format on return of the data to the application.

7. The method of claim 6, wherein the ABI wrapper does not convert the data from the first format to the second format if a native data width of the native MPI library and a native data width of the application are equal.

8. The method of claim 1, further comprising selecting and loading the native MPI library from the ABI wrapper, wherein the native MPI library corresponds to an optimized or debugging library version.

9. An article comprising a machine-accessible medium including instructions that when executed cause a system to:
   receive an application linked against a foreign application binary interface (ABI);
   provide a foreign ABI wrapper associated with the application, wherein the foreign ABI wrapper is written to the foreign ABI;
   bind the application to a native message passing interface (MPI) library linked against a native ABI using the foreign ABI wrapper and a native profiling interface associated with the native MPI library to enable emulation of the foreign ABI with the native ABI, wherein the foreign ABI has different calling conventions than the native ABI; and
   intercept a MPI call from the application to the foreign ABI in the foreign ABI wrapper and call the native MPI library with the foreign ABI wrapper using the native profiling interface to execute the application via the native MPI library.

10. The article of claim 9, wherein the instructions cause the system to emulate the foreign ABI using the native profiling interface and without re-compilation or re-linkage of the application.

11. The article of claim 10, wherein the instructions cause the system to map data of a first bit width to data of a second bit width using the foreign ABI wrapper, wherein the first bit width is associated with the foreign ABI and the second bit width is associated with the native MPI library.

12. The article of claim 9, wherein the instructions cause the system to convert data of a first format associated with the application to data of a second format associated with the native MPI library if a native data width of the native MPI library and a native data width of the application are not equal, otherwise to not convert the data.

13. The article of claim 9, wherein the instructions cause the system to perform correctness checking, trace generation, statistics gathering, and memory checking.

14. The article of claim 9, wherein the instructions cause the system to select and load the native MPI library from the foreign ABI wrapper, wherein the native MPI library corresponds to an optimized or debugging library version.

15. A system comprising:
a processor to execute instructions; and
a memory to store instructions that enable the system to receive an application linked against a foreign application binary interface (ABI), provide a foreign ABI wrapper associated with the application, wherein the foreign ABI wrapper is written to the foreign ABI, dynamically bind the application at runtime to a native message passing interface (MPI) library linked against a native ABI using the foreign ABI wrapper and a native profiling interface associated with the native MPI library, wherein the native profiling interface corresponds to a profiling message passing interface (PMPI), to enable emulation of the foreign ABI with the native ABI, and intercept a MPI call from the application to the foreign ABI in the foreign ABI wrapper and call the native MPI library with the foreign ABI wrapper using the PMPI to execute the application via the native MPI library, wherein the foreign ABI is associated with a MPI library having a different implementation than the native MPI library.

16. The system of claim 15, wherein the instructions cause the system to emulate the foreign ABI using the PMPI and without re-compilation or re-linkage of the application.

17. The system of claim 15, wherein the instructions cause the system to convert data of a first format associated with the application to data of a second format associated with the native MPI library if a native data width of the native MPI library and a native data width of the application are not equal, otherwise to not convert the data.

* * * * *